US009769698B2

(12) United States Patent
Wellington (10) Patent No.: US 9,769,698 B2
(45) Date of Patent: Sep. 19, 2017

(54) SYSTEM AND METHOD FOR LOAD BALANCING

(71) Applicant: Eden Rock Communications, LLC, Bothell, WA (US)

(72) Inventor: Daniel Wellington, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 152 days.

(21) Appl. No.: 14/670,281

(22) Filed: Mar. 26, 2015

(65) Prior Publication Data

US 2015/0289160 A1   Oct. 8, 2015

Related U.S. Application Data

(60) Provisional application No. 61/974,355, filed on Apr. 2, 2014.

(51) Int. Cl.
| | |
|---|---|
| *H04L 12/26* | (2006.01) |
| *H04W 28/02* | (2009.01) |
| *H04W 52/26* | (2009.01) |
| *H04W 72/08* | (2009.01) |
| *H04W 28/08* | (2009.01) |
| *H04W 52/14* | (2009.01) |
| *H04W 52/34* | (2009.01) |
| *H04W 52/22* | (2009.01) |

(52) U.S. Cl.
CPC ... *H04W 28/0268* (2013.01); *H04W 28/0205* (2013.01); *H04W 28/08* (2013.01); *H04W 52/143* (2013.01); *H04W 52/265* (2013.01); *H04W 52/343* (2013.01); *H04W 72/085* (2013.01); *H04W 52/226* (2013.01)

(58) Field of Classification Search
CPC combination set(s) only.
See application file for complete search history.

(56) References Cited

U.S. PATENT DOCUMENTS

| | | | |
|---|---|---|---|
| 2004/0132441 A1* | 7/2004 | Livet | H04W 16/00 455/422.1 |
| 2005/0124369 A1 | 6/2005 | Attar et al. | |
| 2005/0228791 A1* | 10/2005 | Thusoo | G06F 17/30911 |
| 2006/0063521 A1 | 3/2006 | Cheung et al. | |
| 2006/0166664 A1 | 7/2006 | Livet et al. | |

(Continued)

OTHER PUBLICATIONS

International Search Report and Written Opinion for PCT/US2015/022834, filed Mar. 26, 2015.

*Primary Examiner* — Yemane Mesfin
*Assistant Examiner* — Mon Cheri Davenport (57) ABSTRACT

A load balancing process includes determining when the cell is overloaded, determining whether the cell is in a hold state, maintaining a current mitigation state for the cell when the cell is determined to be in a hold state, determining whether traffic has decreased for the cell since a previous time and whether mitigation was applied to the cell at the previous time, applying a hold state to the cell when the traffic is determined to have decreased and the mitigation is determined to have been applied, determining whether performance has decreased by a predetermined level for the cell when the cell is not in the hold state, and applying mitigation to the cell when performance has decreased by at least the predetermined level. Such a process may be implemented as a state machine in a system.

15 Claims, 6 Drawing Sheets

(56) References Cited

U.S. PATENT DOCUMENTS

2009/0232001 A1\* 9/2009 Gong ................... H04L 47/10
370/236
2011/0004884 A1 1/2011 Merchant et al.

\* cited by examiner

| Mitigation State | 3 |
| --- | --- |
| Remaining Time | 17 |
| Original Handover Offset | 3.0 |
| Original CPICH Value | -90 |
| CP | Yes |
| Hold Further Change | No |
| KPI_R | RTWP = 2.5% |
| VE | 6.4 |
| DE | 40.3 |
| VEN | 123.5 |
| DEN | 212 |
| Commit Change | Yes |
| Cell ID | US4A-LT3141 |

| VE | 18.3 |
| --- | --- |
| DE | 94.1 |
| VEN | 268 |
| DEN | 315 |
| Original Handover Offset | 0 |
| Original CPICH Value | -88 |
| KPI_R | DCR=3.2%; DC=8 |
| Cell ID | US7A-UM1337 |

SYSTEM AND METHOD FOR LOAD BALANCING

CROSS-REFERENCES TO RELATED APPLICATIONS

The present disclosure claims priority to U.S. Provisional Application No. 61/974,355, filed Apr. 2, 2014, which is incorporated by reference herein for all purposes.

BACKGROUND

Wireless cellular deployments often are deployed in an extended metro or regional coverage area. Often, because of inhomogeneous distributions of mobile user terminals, cells in one part of the network will become overloaded yet nearby cells have surplus radio channel capacity for providing network services. In such scenarios it is useful to reconfigure the cellular network so that some of the users of the overloaded cells have their serving cell changed to nearby cells with surplus through a process known as load balancing.

Conventional load balancing has a number of disadvantages. Load balancing systems apply mitigation on an ad-hoc basis, so they may fluctuate excessively. Algorithms for conventional systems can have a high degree of complexity, leading to unnecessary resource consumption. Furthermore, it is possible to apply excessive mitigation to highly loaded cells resulting in coverage gaps.

BRIEF SUMMARY

Embodiments of the present disclosure relate to a method, system and apparatus for load balancing in a cellular network. Advantages provided by various embodiments include efficient processing, stability, rapid response time, limiting negative impacts of mitigation, etc. Embodiments are implemented as a finite state machine which includes two data tables, and may be heuristic implementations.

A load balancing process according to an embodiment includes determining when the cell is overloaded, determining whether the cell is in a hold state, maintaining a current mitigation state for the cell when the cell is determined to be in a hold state, determining whether traffic has decreased for the cell since a previous time and whether mitigation was applied to the cell at the previous time, applying a hold state to the cell when the traffic is determined to have decreased and the mitigation is determined to have been applied, determining whether performance has decreased by a predetermined level for the cell when the cell is not in the hold state, and applying mitigation to the cell when performance has decreased by at least the predetermined level.

In an embodiment, the process further includes determining whether a timer has been initiated for the cell, when no timer has been initiated, initiating the timer for the cell, and terminating the mitigation for the cell when the timer expires. The hold state may expire when the timer expires.

The process may include storing a current value for at least one parameter of the cell in a memory when mitigation is initiated for the cell, and restoring the stored value for at least one parameter of the cell when mitigation is removed for the cell. Applying the mitigation may include adjusting the at least one parameter.

Applying mitigation to a cell may include at least one of changing a handover offset value and changing a transmission power level. The level of mitigation may be applied by incrementing through a plurality of predetermined mitigation states. In addition, the steps of determining whether the cell is in a hold state, applying a hold state, determining whether performance has decreased, and applying mitigation may be implemented by processing a finite state machine at a predetermined interval.

In an embodiment in which the finite state machine is processed, the processing may include updating a first table that includes information for a plurality of cells that are being mitigated, and updating a second table that only includes information for a plurality of cells that have failed a performance criteria in a previous predetermined interval. The first table may be compared to the second table, and when information for a first cell is present in the second table but not the first table, the information for the first cell may be added to the first table.

In an embodiment, determining whether the performance has decreased by a predetermined level for the cell when the cell is not in the hold state is performed by determining whether information for the cell is present in the second table. In addition, determining whether traffic has decreased for the cell may include determining whether the traffic has decreased for co-sited inter frequency neighbors of the cell and for inter frequency neighbors of the cell at different base stations.

DETAILED DESCRIPTION

Embodiments of the present disclosure are directed to dynamic closed-loop load balancing. Embodiments may be implemented as systems or methods in wireless communications networks such as Nokia Solutions and Networks (NSNs) and Ericsson Radio Access Networks (RANs). Although embodiments are described using Universal Mobile Telecommunications System (UMTS) terminology, embodiments are not limited thereto, and embodiments may use other technologies such as Long Term Evolution (LTE).

Embodiments of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of this disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures. The scope of this disclosure is limited only by the claims and encompasses numerous alternatives, modifications and equivalents. Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
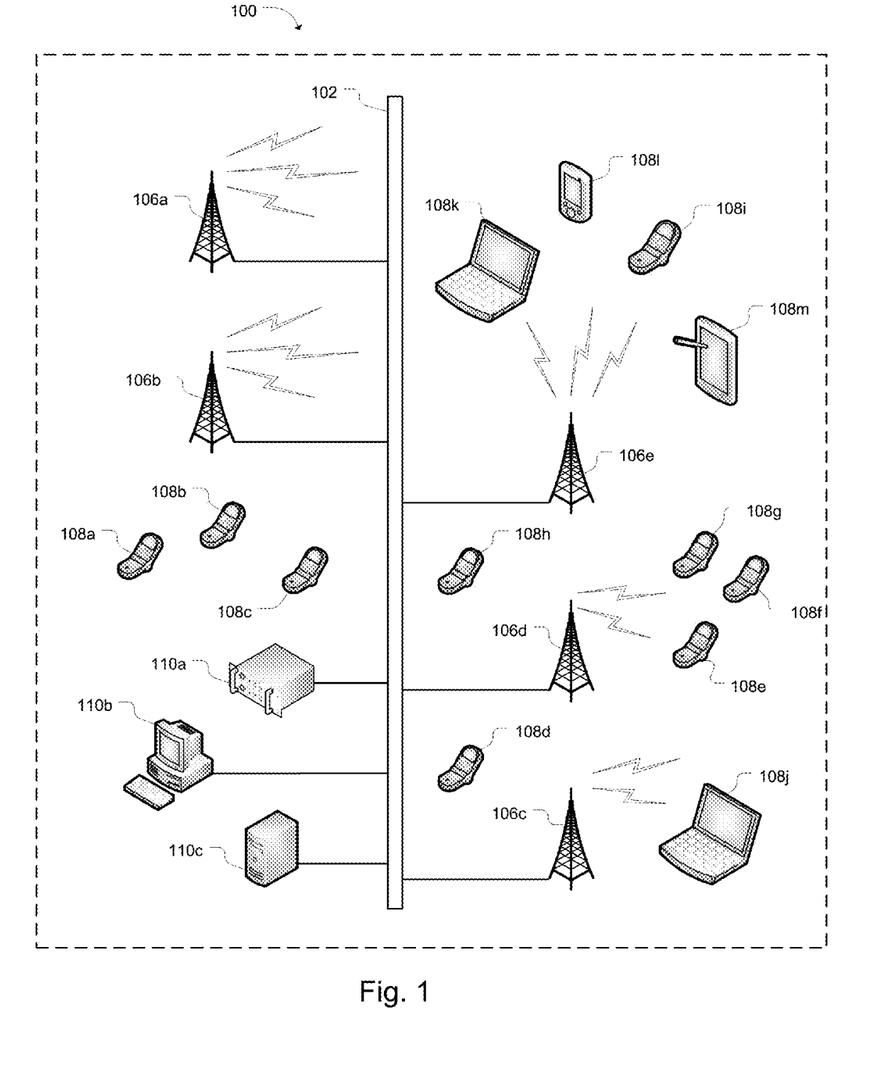
FIG. 1 illustrates a wireless communication system according to an embodiment.

FIG. 1 illustrates a networked communications system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, and femtocells.

In a system 100 according to an embodiment, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked communications system 100.

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of this disclosure, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
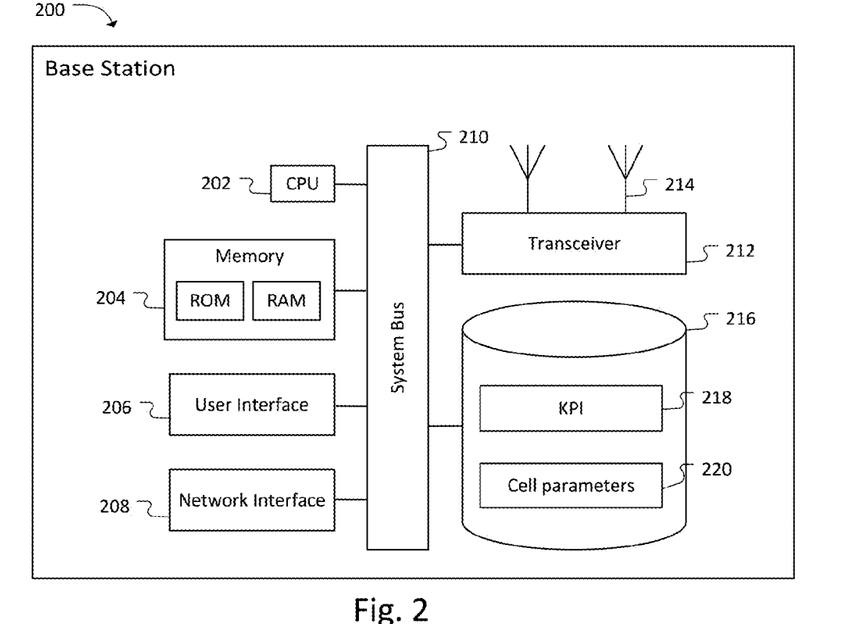
FIG. 2 illustrates a base station controller according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and non-volatile (ROM) system memories 204.

Base station 200 may include a user interface 206 for inputting and retrieving data to and from the base station by operator personnel, and a network interface coupled to a wireline portion of the network. In an embodiment, the base station 200 may send and receive data to and from other network elements through network interface 208. In an embodiment, Network Interface 208 is an X2 interface. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data storage 216 and CPU 202 which executes the program. In an embodiment, data storage 216 may store KPI 218 and Cell parameters 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
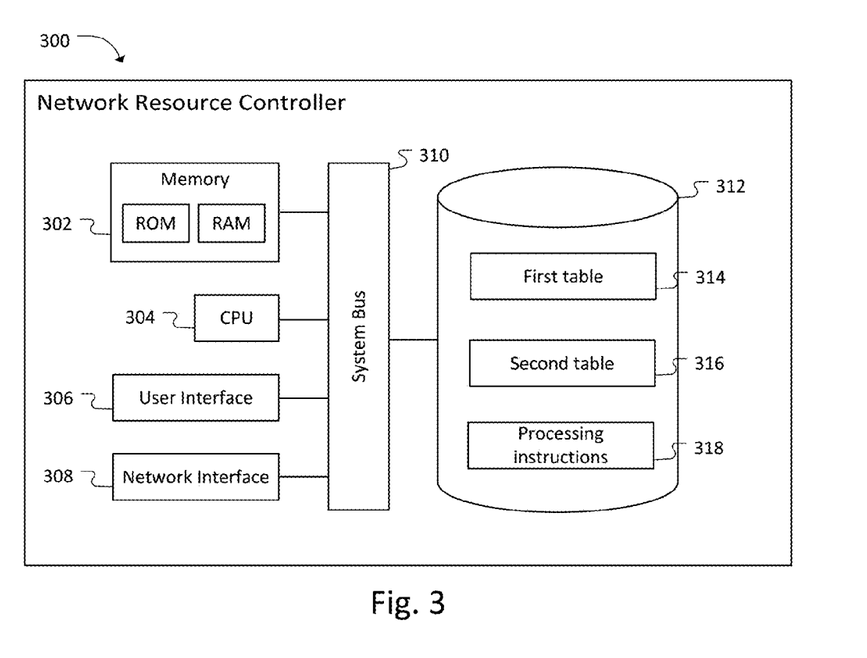
FIG. 3 illustrates a network resource controller according to an embodiment.

FIG. 3 illustrates a block diagram of an NRC 300 that may be representative of any of the network controller devices 110a-c. Accordingly, NRC 300 may be representative of a Network Management Server (NMS) an Element Management Server (EMS), or a Mobility Management Entity (MME). In an embodiment, one or more of the network controller devices 110a-c are SON controllers. The NRC 300 has one or more processor devices including a CPU 304.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may store, for example, a first table 314, a second table 316, and processing instructions 318 for processing the first and second tables.

The NRC 300 may also include a user interface 306 that allows an administrator to interact with the NRC's software and hardware resources and to display the performance and operation of the system 100. In addition, the NRC 300 may include a network interface 306 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
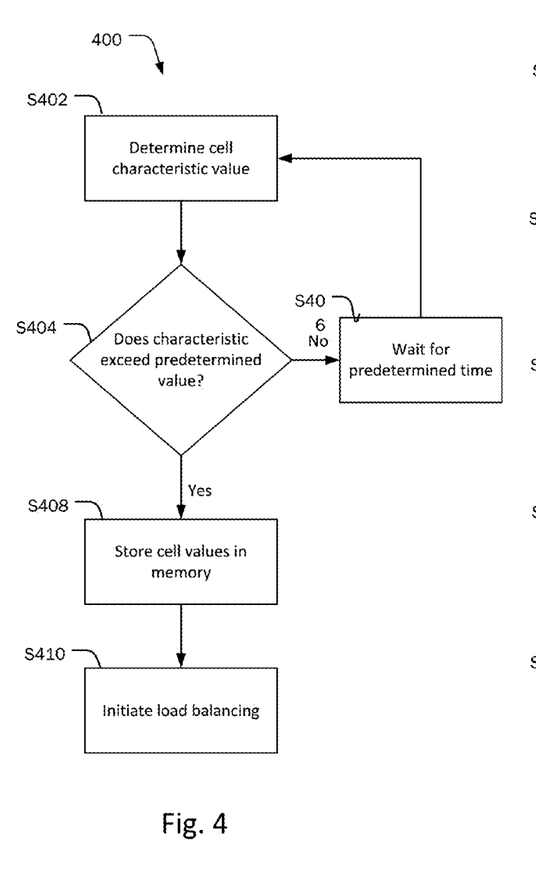
FIG. 4 illustrates a process for identifying cells for load balancing according to an embodiment.

FIG. 4 illustrates a method 400 for identifying cells for load balancing operations, or determining when a cell is overloaded. At S402, a cell characteristic value is determined in order to evaluate the need for load balancing in the cell. Accordingly, the cell characteristic is a characteristic that relates to loading of the cell. Examples of cell characteristics that are determined at S402 include Voice Dropped Call Rate (DCR), total dropped calls, HSDPA (High-Speed Downlink Packet Access) Dropped Call Rate (HSDPA DCR), total HSDPA drops, Access Failure Rate (AFR), total access failures, Data Failure Rate (DFR), total data failures, and various Key Performance Indicators (KPI) that are associated with congestion. Determining cell characteristic values S402 may include measuring the cell characteristics by monitoring and recording cell activity.

At S404, one or more cell characteristic is compared to a predetermined value, and if the characteristic does not exceed the predetermined value, the system waits for a predetermined time period at S406 before determining one or more cell characteristic value again at S402. The predetermined time may be a set time such as 1 minute, 15 minutes, or one hour. In another embodiment, the predetermined time relates to other processes in a cellular network system. For example, the predetermined time may be a KPI reporting interval. Different predetermined times may be used for different cell characteristics.

Similarly, the particular cell characteristics and predetermined values compared at S404 may vary between embodiments. Furthermore, in some embodiments S404 may require two characteristics both exceeding respective predetermined values to initiate load balancing. Examples of cell characteristics and predetermined values that have been found to be effective in identifying load balancing opportunities include the following:

1. When Voice DCR exceeds 2% and Voice Drops exceed 4 in a 15 minute period.
2. When HSDPA DCR exceeds 2% and HSDPA Drops are greater than 6 in a 15 minute period.
3. When Uplink Received Total Wideband Power (RTWP) exceeds −90 dBm.
4. When Voice AFR exceeds 3% and total Voice Access Failures exceed 6 in a 15 minute period.
5. When Data AFR exceeds 3% and Data Access Failures exceed 10 in a 15 minute period.

In the above examples, each of the examples 1, 2, 4 and 5 compare two separate cell characteristic values to separate threshold values, and load balancing is not initiated for the cell unless both cell characteristics exceed their respective predetermined values. However, example 3 only compares a single cell characteristic value at S404. Thus, in various embodiments, one or more cell characteristic value may be compared at S404.

In an embodiment, multiple sets of cell characteristic values are compared to sets of predetermined values, and load balancing is initiated for cells whose sets exceed the predetermined values. For example, an embodiment may compare cell characteristic values according to the examples above, and if any of the cell characteristics of any set exceed respective predetermined values, load balancing is initiated.

Embodiments are not limited by the specific values of examples 1-5 above. Examples 1-5 have been found to be an effective combination of cell characteristics for determining whether to initiate load balancing. However, in other embodiments, other cell characteristics may be measured and compared at S404. For example, S404 may include comparing one or more KPI to a predetermined value, where the KPI relates to a load on a cell, and the predetermined value is selected based on when load balancing operations are appropriate for a cell.

When one or more cell characteristic value is found to exceed an associated predetermined value, current parameters of the cell may be stored in a memory at S408. More specifically, in an embodiment, a current value for one or more cell parameter that can mitigate traffic at the cell is stored in a computer of an Operations Support System (OSS) for the cell. Examples of parameters whose values are stored at S408 include a handover offset parameter and a Common Pilot Channel (CPICH) power parameter. The cell parameters whose values are stored at S408 may be cell parameters that are adjusted in subsequent load balancing operations. The memory may be called upon in a later operation to restore the original cell parameters.

When the cell parameters are in a state of mitigation, the amount of bias from original or default values may be stored at S408 as well. For example, a default CPICH value for a cell may be 92 dB. However, optimization software running on the communications system may be mitigating the CHPICH value by −2 dB at the time that S404 is performed. In such an example, both the default CPICH value and the amount of mitigation may be stored in memory at S408. In addition, S408 may store the cell characteristic value that exceeded the predetermined value at S404, as well as the cell characteristic associated with the value.

At S410, load balancing is initiated for cells for which one or more characteristic exceeded the predetermined value at S404. When load balancing is initiated for a cell, a timer may be started, and when the timer expires, characteristics of cells that are undergoing load balancing may be returned to original values that were stored at S408.

Figure 5:
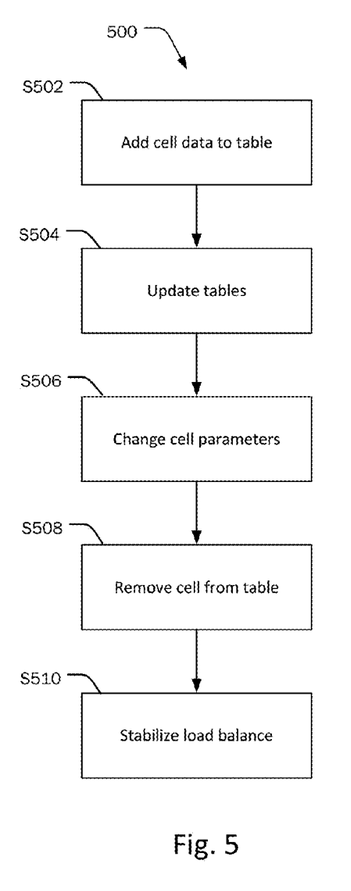
FIG. 5 illustrates a load balancing process according to an embodiment.

FIG. 5 shows a process 500 of load balancing a plurality of cells according to an embodiment. The process 500 is illustrated broadly in FIG. 5, and aspects of the process are explained in more detail with respect to additional figures and processes. Load balance mitigation may be performed using a state machine expressed through one or more table.

At S502, cell data for cells which are being load balanced are added to a table. The cell data may include data related to the parameters of the cell and data related to logic performed by the state machine. The table is updated at S504. Updating the table S504 may include writing data from a first table to a second table, removing data from either table, or modifying the contents of one or more field of a table based on performance metrics or contents of the table.

Cell parameters of cells in the table are changed at S506. Changing parameters S506 may include changing the value of one or more cell parameter in order to change the load on the cell. In an embodiment, changing the parameters includes applying a mitigation state of a set of predetermined mitigation states to a cell.

Cells are removed from a table at S508. Removing a cell from the table may include reverting cell parameters to original values for the cell when it was added to the table. A cell may be removed from the table when an upper limit of mitigation has been reached, when performance metrics suggest that load balancing is no longer beneficial, or when a timer has expired. Some embodiments may stabilize a load balance at S510 by comparing cell performance before load balancing operations to cell performance after load balancing operations.

Figure 6A:
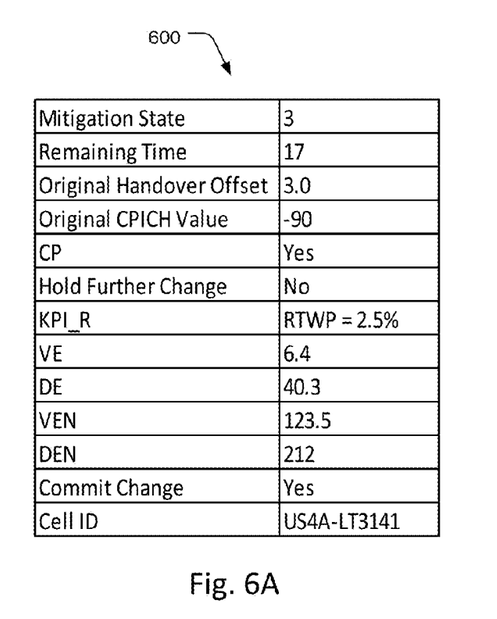
FIG. 6A illustrates a first table according to an embodiment.
Figure 6B:
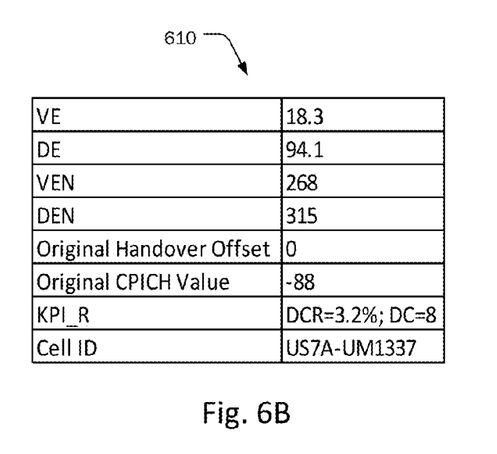
FIG. 6B illustrates a second table according to an embodiment.

FIGS. 6A and 6B show embodiments of tables that may be used to store cell data. FIG. 6A shows a first table 600 that is an active load balancing mitigation table and may also be referred to as a holding pen, while FIG. 6B shows a second table 610. Differences in the contents and features of these tables will become more apparent in view of subsequent discussion below.

FIG. 6A includes a plurality of fields that are indicated in the left column by abbreviations. A brief description of the fields is provided here.

Mitigation State: The value in this field corresponds to a level of mitigation that is being applied to a cell. Levels of mitigation may correspond to modifications to the handover offset and CPICH values for a cell. In an embodiment, lower levels of mitigation state modify the handover offset up to a predetermined amount so that handovers are biased out of the congested cell, while higher levels of offset modify the CPICH value. For example, an embodiment with eight levels of mitigation state may decrement the original handover offset (OHO) and original CPICH (OC) by a for a cell according to mitigation states MS(N) as follows, with the offset values expressed in decibels:

MS(0)=(OHO, OC)
MS(1)=(OHO−1.5, OC+0)
MS(2)=(OHO−3.0, OC+0)
MS(3)=(OHO−3.0, OC−3.0)
MS(4)=(OHO−3.0, OC−6.0)
MS(5)=(OHO−3.0, OC−9.0)
MS(6)=(OHO−3.0, OC−12.0)
MS(7)=(OHO−3.0, OC−15.0)

Remaining Time: The value in this field corresponds to a time or number of cycles for which a cell is scheduled to remain in a mitigation state, and may vary from 0 to Max_Hold_Time. A Remaining Time value may be an integer that corresponds to an increment of time. For example, in an embodiment, each integer increment corresponds to 15 a minute interval, so a Remaining Time value of 32 represents 32 15 minute intervals, or 8 hours. In the embodiment of FIG. 6A, the Remaining Time is a time increment or cycle at which the table is processed or refreshed. In other embodiments, Remaining Time may be a raw time value, etc. The Remaining Time value may initiate at Max_Hold_Time when mitigation is first applied and decrement with each cycle until it expires, at which point original values may be reapplied to each cell, thereby reverting cells to an original state.

Original Handover Offset: The handover offset value for the cell recorded at S408.

Original CPICH Value: The CPICH value for the cell recorded at S408.

CP: The value in this field represents whether the mitigation state changed during the last update cycle, which can represent Yes or No.

Hold Further Change: The value in this field represents whether a change from two cycles ago was reverted on the previous step, which can represent Yes or No. When the value in this field is set to Yes, it may remain as Yes until a load balancing timer, which was started when load balancing mitigation was initiated, expires. The timer may be represented by the Remaining Time value.

KPI_R: This field may store one or more KPI value that was stored at S408, and it may include the one or more KPI type and value.

VE: Total Voice Erlangs for the cell.

DE: Total High-Speed Downlink Packet Access (HSDPA) Erlangs for the cell.

VEN: Total voice Erlangs for a set of intra-frequency neighbors and the co-sited inter-frequency neighbors of the cell.

DEN: Total HSDPA Erlangs for a set of intra-frequency neighbors and the co-sited inter-frequency neighbors of the cell.

Commit Change: The value in this field represents whether to commit a change at the end of an update cycle, which can represent Yes or No.

Cell ID: A value that identifies a particular mitigated cell.

Each of the values for VE, DE, VEN and DEN are for a single update cycle. So when the update cycle is 15 minutes, the values in these fields represent the total number of Erlangs in the previous 15 minute cycle. Embodiments are not limited to the specific example shown as table 600.

FIG. 6B shows an example of a second table 610. The second table 610 may include data for cells associated with a characteristic that failed the test criteria at S404. A cell may be in table 600 and table 610 at the same time. The second table may be updated in conjunction with the first table according to the same cycle time, and it may be refreshed at each cycle so that it only includes data for cells that were identified as having performance issues in process 400 during the last cycle.

Figure 7:
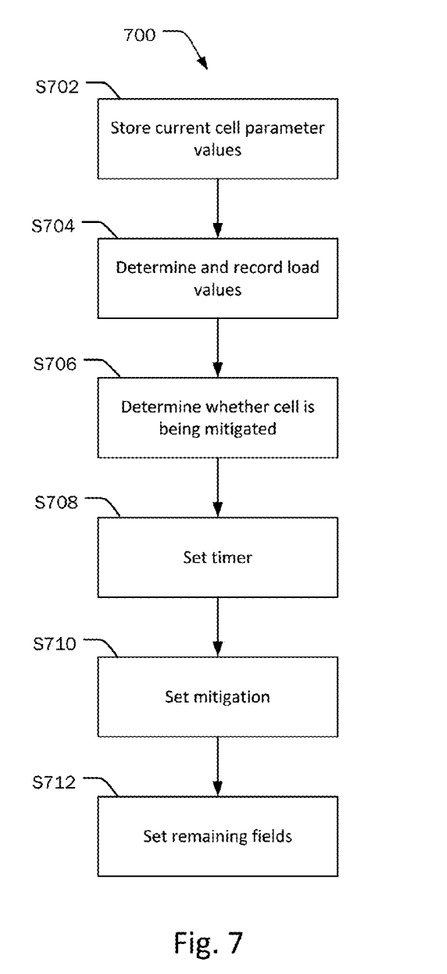
FIG. 7 illustrates a process for adding cell data to a table according to an embodiment.

FIG. 7 shows a process 700 for adding cell data to one or more table. Process 700 corresponds to S502 of process 500 described above. Process 700 may be initiated for a given cell when the cell becomes overloaded, which may be determined when one or more cell characteristic fails the comparison at S404.

Adding cell data to second table 610 includes a first step of storing current cell parameter values S702. In this step, current cell parameter values for a cell for which load balancing has been initiated are added to second table 610. As seen in FIG. 6B, in an embodiment the current parameters are a handover offset value and a CPICH value. These values are referred to as original values for the cell.

At S704, load values are recorded for the cell. In the embodiment shown in FIG. 6B, the load values are voice Erlangs VE for the cell, HSDPA Erlangs DE for the cell, total voice Erlangs VEN for a set of intra-frequency neighbors which may include co-sited cells, and total HSDPA Erlangs DEN for the set of inter-frequency neighbors.

At 706, process 700 determines whether the cell added to second table 610 is currently being mitigated. 702 may determine whether the cell appears in first table 600, which indicates that it is currently being mitigated. The cell is a newly added cell when it is present in second table 610, but not present in first table 600. When the cell appears in first table 600, process 700 terminates, and first table 600 is processed as described below. However, if the cell does not appear in first table 600, the following steps of process 700 are performed to add data for the cell to the first table 600.

At S708, when cell data is added to first table 600 a timer field is populated. In the embodiment shown in FIG. 6A, the timer field is "Remaining Time." The initial timer value may initiate at Max_Hold_Time. In an embodiment, the timer value may depend on one or more condition, such as the time of day, load history for the cell, states of other cells in the table, or KPI values for the cell.

At S710, when a cell is added to first table 600, a mitigation state is added to the table. The mitigation state value may be an integer value that corresponds to a predetermined mitigation state M(N) as described above. In another embodiment, the mitigation state field may include the parameters that are being mitigated and the degree of mitigation. The mitigation state field may initialize at a lowest degree of mitigation. In the example above, this state is M(1), which reduces the Original Handover Offset value by 1.5 decibels.

At S712, remaining fields of the table are populated. In the first table 600 of FIG. 6A, these fields are CP, Hold Further Change, and Commit Change. In an embodiment, these fields initialize as CP=Yes, Hold Further Change=No, and Commit Change=Yes. When a cell exists in both tables, the value for KPI_R in second table 610 may be added to the KPI_R field of first table 600 so that table 600 includes KPI values for the KPI failure that initiated mitigation, as well as all subsequent KPI failures during the course of mitigation. In other embodiments, only the original KPI failure is present in first table 600, or only the most recent KPI failure is present in table 600. Other values of the tables, such as Erlangs, Cell ID, and original values, may be transferred from the second table 610 to the first table 600.

Figure 8:
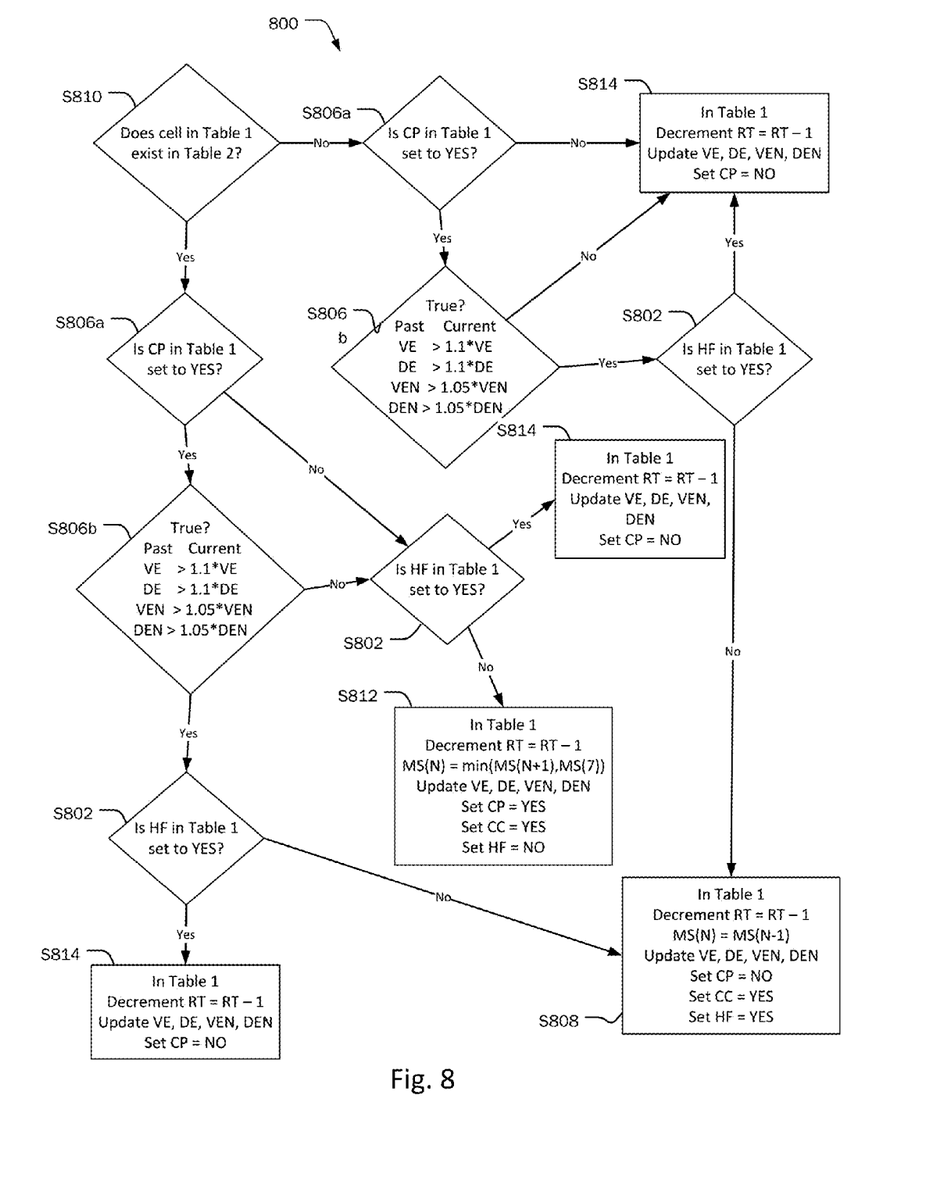
FIG. 8 illustrates a load balancing process according to an embodiment.

Processes for load balancing will now be explained with respect to FIGS. 8 and 9. FIG. 8 shows a specific embodiment of a load balancing operation using a state machine. Load balancing process 800 relates to first table 600, and may be performed for each cell that exists in first table 600.

Figure 9:
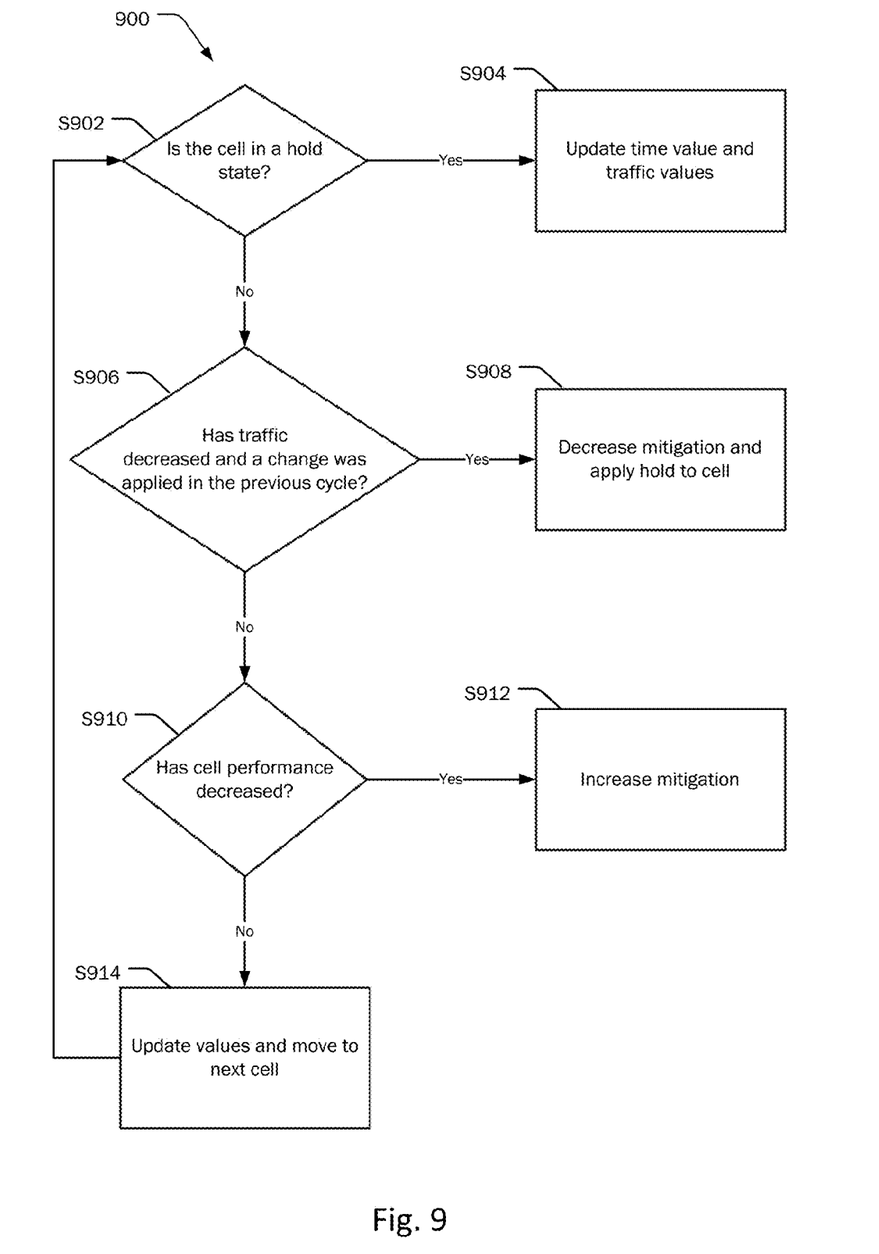
FIG. 9 illustrates a load balancing process according to an embodiment.

Meanwhile, FIG. 9 shows a more general process 900 for load balancing according to embodiments of this disclosure. Although the illustrations and descriptions of process 800 and process 900 differ from one another, they are also compatible with one another. Process 800 is a more specific implementation of process 900.

Process 900 determines whether a cell is in a hold state at S902. In process 800, this is accomplished at S802 by reading the hold further value in table 600. When the cell is determined to be in a hold state, a timer value and traffic values are updated for the cell at S904. In the embodiment of FIG. 8, this is accomplished at S814 by decrementing the time value and updating the voice Erlangs and data Erlangs data for the cell and one or more neighboring cells. In addition, S814 sets the previous change (CP) value to no because no change was made to the cell's mitigation. If S902 determines that the cell is not in a hold state, process 900 proceeds to S906.

At S906, the process determines whether traffic has increased to the cell and a mitigation state change was applied to the cell. In FIG. 8, the corresponding step S806b compares current values for data and voice Erlangs for the instant cell and neighboring cells to previous voice and data Erlangs. When voice and data Erlangs for the cell from the previous cycle are more than 10% greater than voice and data Erlangs for the current cycle and current voice and data Erlangs for the cell's intra-frequency neighbors are more than 5% higher in the previous cycle than the current cycle, traffic is determined to have been decreased to an unacceptable level. In addition, S906 and S806a determine whether a mitigation state was increased in the previous cycle. When both of these conditions are met, the amount of mitigation applied to the cell is decreased and a hold state is applied to the cell at S908 and S808.

In a more general sense, S906, S806a and S806b determine whether a previous mitigation change resulted in an unacceptable level of traffic loss. It should be recognized that the specific values used in these embodiments are merely examples, and that other embodiments may use other particular schemes for determining when to stop applying more mitigation to a cell. When excessive mitigation is applied to cells, the size of the cells may shrink to a size that causes substantial gaps in cell coverage. Evaluating traffic loss over time, reducing a mitigation state and applying a hold state to a cell prevents such gaps from occurring. In addition, this these processes may ensure that performance improvements from the load balancing process are not merely due to under-powering cells and denying traffic.

S910 determines whether performance has decreased at the cell. As seen in the specific embodiment of S810, this may be accomplished by determining whether the cell is in second table 610. More generally, S910 may look at the result of comparing the cell characteristic to a predetermined value at S404.

When the cell's performance is determined to have decreased more than a predetermined amount, the degree of mitigation applied to the cell is increased at S912. As seen in S812, this may be accomplished by incrementing the mitigation state to a higher level up to a maximum level. The specific parameters and quantities for mitigation may differ between various embodiments, or even be individual to particular cells or types of cells in a network.

If it is determined that cell performance has not degraded, values for the cell are updated and the next cell is analyzed at S914. Updating the values for the cell may include updating values for traffic of the cell and its inter-frequency neighbors, decrementing a remaining time value, and if no change was made to the mitigation state, setting the CP value to No as seen in S814. In addition, the commit change value may be set to No after changes for the current cycle are committed to the cell.

When a timer value is at a minimum, after decrementing the timer, the original cell values that were stored when mitigation was initiated for the cell may be restored. Examples of these values are the Original Handover Offset and Original CPICH Value listed in first table 600.

FIG. 8 shows setting the value of a commit change ("CC") field to "YES" in certain operations. As discussed above, the value in this field defaults to "NO." In an embodiment, after it has been set to YES, the system commits changes to the mitigation state of the cell and confirms that the change was successfully applied before reverting to NO.

In an embodiment, the amount of cells that are undergoing mitigation at a time may be limited for a particular network area. For example, the system may be have an upper limit value such that it will not simultaneously mitigate more cells than the upper limit value. The upper limit value may be checked each time the tables are processed, and if the number of unique cells in both tables exceeds the upper limit, cells may be removed from mitigation, or additional cells may not be mitigated. When cells are removed from mitigation, they may be selected based on the amount of time that they have been in mitigation, KPI values, the amount of mitigation that is currently applied to the cell, geographic location, etc.

The broad teachings of this disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A load balancing method for a cell in a wireless network, the method comprising:
   determining when the cell is overloaded;
   determining whether the cell is in a hold state;
   maintaining a current mitigation state for the cell when the cell is determined to be in a hold state;
   determining whether traffic has decreased for the cell since a previous time and whether mitigation was applied to the cell at the previous time;
   applying a hold state to the cell when the traffic is determined to have decreased and the mitigation is determined to have been applied;
   determining whether performance has decreased by a predetermined level for the cell when the cell is not in the hold state; and
   applying mitigation to the cell when performance has decreased by at least the predetermined level,
   wherein the steps of determining whether the cell is in a hold state, applying a hold state, determining whether performance has decreased, and applying mitigation are implemented by processing a finite state machine at a predetermined interval by:
      updating a first table that includes information for a plurality of cells that are being mitigated;
      updating a second table that only includes information for a plurality of cells that have failed a performance criteria in a previous predetermined interval;
      comparing the first table to the second table; and
      when information for a first cell is present in the second table but not the first table, adding the information for the first cell to the first table,
   wherein determining whether the performance has decreased by a predetermined level for the cell when the cell is not in the hold state is performed by determining whether information for the cell is present in the second table.

2. The method of claim 1, further comprising:
   determining whether a timer has been initiated for the cell;
   when no timer has been initiated, initiating the timer for the cell; and
   terminating the mitigation for the cell when the timer expires.

3. The method of claim 2, wherein the hold state expires when the timer expires.

4. The method of claim 1, further comprising:
   storing a current value for at least one parameter of the cell in a memory when mitigation is initiated for the cell; and
   restoring the stored value for at least one parameter of the cell when mitigation is removed for the cell,
   wherein applying the mitigation includes adjusting the at least one parameter.

5. The method of claim 1, wherein applying the level of mitigation includes at least one of changing a handover offset value and changing a transmission power level.

6. The method of claim 1, wherein applying the level of mitigation includes incrementing through a plurality of predetermined mitigation states.

7. The method of claim 1, wherein determining whether traffic has decreased for the cell includes determining whether the traffic has decreased for co-sited inter frequency neighbors of the cell and for inter frequency neighbors of the cell at different base stations.

8. A wireless communication system comprising:
   a plurality of base stations;
   a memory;
   a processor; and
   a non-transitory computer readable medium with computer executable instructions stored thereon which, when executed by the processor, perform the following method:
      determining when a cell in the wireless communication system is overloaded;
      determining whether the cell is in a hold state;
      maintaining a current mitigation state for the cell when the cell is determined to be in a hold state;

determining whether traffic has decreased for the cell since a previous time and whether mitigation was applied to the cell at the previous time;

applying a hold state to the cell when the traffic is determined to have decreased and the mitigation is determined to have been applied;

determining whether performance has decreased by a predetermined level for the cell when the cell is not in the hold state; and applying mitigation to the cell when performance has decreased by at least the predetermined level, wherein the steps of determining whether the cell is in a hold state, applying a hold state, determining whether performance has decreased, and applying mitigation are implemented by processing a finite state machine at a predetermined interval by:

updating a first table that includes information for a plurality of cells that are being mitigated;

updating a second table that only includes information for a plurality of cells that have failed a performance criteria in a previous predetermined interval, comparing the first table to the second table; and when information for a first cell is present in the second table but not the first table, adding the information for the first cell to the first table, wherein determining whether the performance has decreased by a predetermined level for the cell when the cell is not in the hold state is performed by determining whether information for the cell is present in the second table.

9. The system of claim 8, wherein the method further comprises:

determining whether a timer has been initiated for the cell;

when no timer has been initiated, initiating the timer for the cell; and terminating the mitigation for the cell when the timer expires.

10. The system of claim 9, wherein the hold state expires when the timer expires.

11. The system of claim 8, wherein the method further comprises:

storing a current value for at least one parameter of the cell in the memory when mitigation is initiated for the cell; and restoring the stored value for at least one parameter of the cell when mitigation is removed for the cell, wherein applying the mitigation includes adjusting the at least one parameter.

12. The system of claim 8, wherein applying the level of mitigation includes at least one of changing a handover offset value and changing a transmission power level.

13. The system of claim 8, wherein applying the level of mitigation includes incrementing through a plurality of predetermined mitigation states.

14. The system of claim 8, wherein determining whether traffic has decreased for the cell includes determining whether the traffic has decreased for co-sited inter frequency neighbors of the cell and for inter frequency neighbors of the cell at different base stations.

15. A non-transitory computer readable medium with computer readable instructions stored thereon which, when executed by a processor, perform the following method:

determining when a cell in a wireless communication system is overloaded;

determining whether the cell is in a hold state;

maintaining a current mitigation state for the cell when the cell is determined to be in a hold state;

determining whether traffic has decreased for the cell since a previous time and whether mitigation was applied to the cell at the previous time;

applying a hold state to the cell when the traffic is determined to have decreased and the mitigation is determined to have been applied;

determining whether performance has decreased by a predetermined level for the cell when the cell is not in the hold state; and applying mitigation to the cell when performance has decreased by at least the predetermined level, wherein the steps of determining whether the cell is in a hold state, applying a hold state, determining whether performance has decreased, and applying mitigation are implemented by processing a finite state machine at a predetermined interval by:

updating a first table that includes information for a plurality of cells that are being mitigated;

updating a second table that only includes information for a plurality of cells that have failed a performance criteria in a previous predetermined interval, comparing the first table to the second table; and when information for a first cell is present in the second table but not the first table, adding the information for the first cell to the first table, wherein determining whether the performance has decreased by a predetermined level for the cell when the cell is not in the hold state is performed by determining whether information for the cell is present in the second table.

* * * * *